Jan. 17, 1967  L. R. WALLER  3,298,303
FOOD HEATER
Filed May 26, 1965
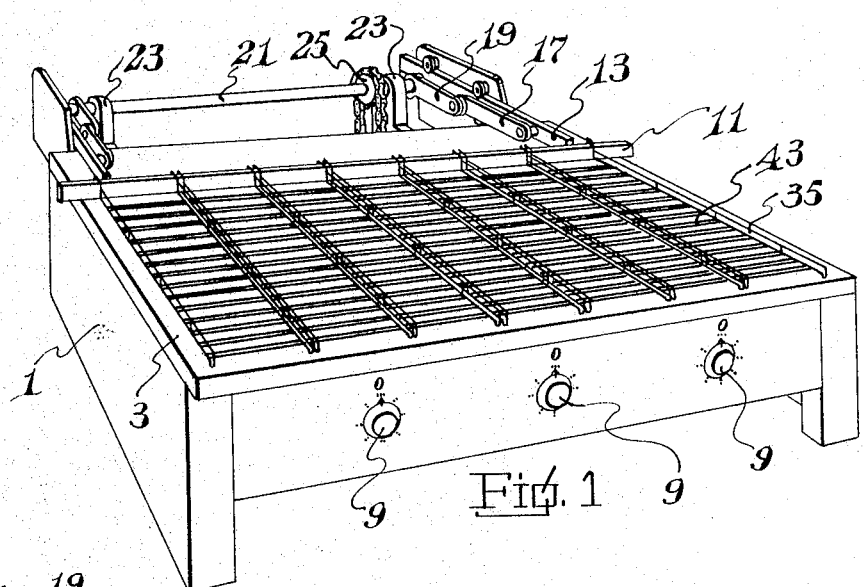
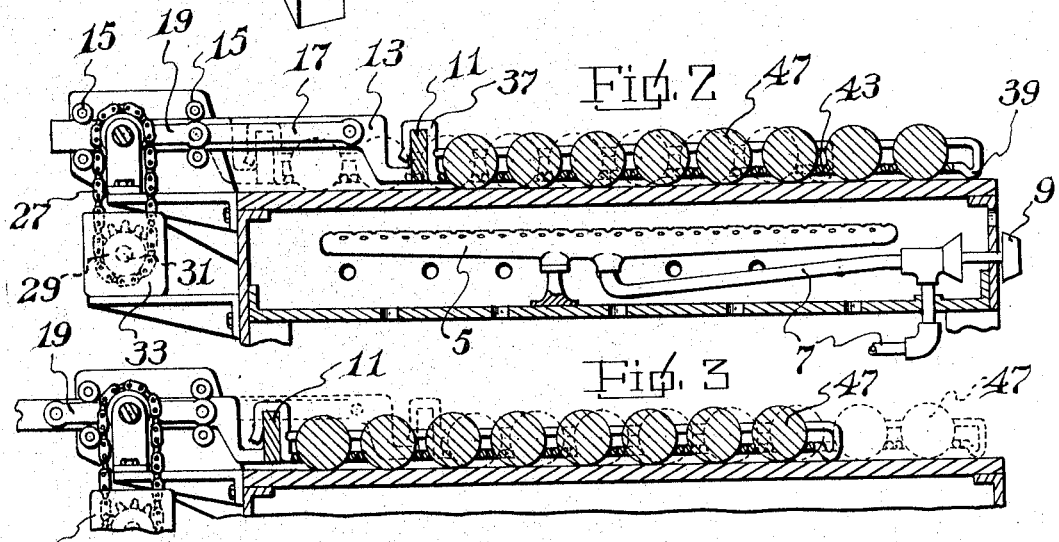
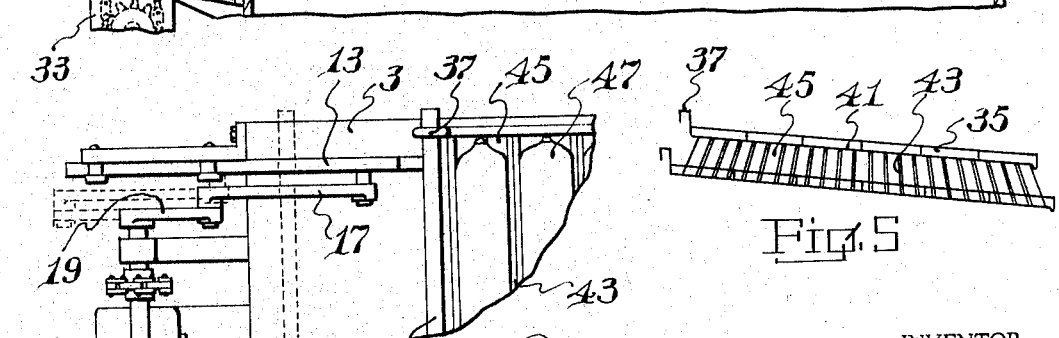
INVENTOR.
Leo R. Waller
BY
Young and Thompson
ATTYS.

United States Patent Office 3,298,303
Patented Jan. 17, 1967

3,298,303
FOOD HEATER
Leo R. Waller, 1229 N. Rosedale, Tulsa, Okla. 74127
Filed May 26, 1965, Ser. No. 459,058
6 Claims. (Cl. 99—423)

The present invention relates to a food heater of the hot plate type, more particularly of the type in which the food is moved about on the plate so as to contact different sides of the food with the plate so as to heat the food evenly. The term "heater" as used in this specification and the appended claims includes not only cookers, in which the chemical composition of the food changes, but also warmers for warming food to a temperature below the cooking temperature or merely for maintaining food warm, such as foods that have been previously cooked. The invention has particular utility and will be illustrated in connection with the heating of frankfurters, however, it is expressly to be understood that it is also useful in connection with the heating of food other than frankfurters.

An object of the present invention is the provision of a food heater in which all sides of the food are subjected to fairly uniform heat.

Another object of the present invention is the provision of a food heater from which heated food can be removed and to which food to be heated can be added without completely unloading or loading the heater.

Still another object of the present invention is the provision of a food heater through which the food moves in series.

Finally, it is an object of the present invention to provide a food heater which will be relatively simple and inexpensive to manufacture, easy to install, load and unload and maintain and operate, and rugged and durable in use.

Other objects and advantages of the present invention will become apparent from a consideration of the following description, taken in connection with the accompanying drawing, in which:

FIGURE 1 is a perspective view of a food heater according to the present invention;

FIGURE 2 is a fragmentary side cross-sectional view of the heater of FIGURE 1, showing the parts in one position in full line and in another position in phantom line;

FIGURE 3 is a view similar to FIGURE 2 but showing the parts in full and phantom line in the reverse of the positions shown in FIGURE 2;

FIGURE 4 is a fragmentary plan view of the operating mechanism of the present invention; and FIGURE 5 is a perspective view of an individual rack useful with the food heater of the present invention.

Referring now to the drawing in greater detail, there is shown a food heater comprising a base 1. Base 1 has an upper extensive heating surface provided by a horizontal plate 3 beneath which a plurality of burners 5 are located to heat plate 3. Gas lines 7 supply combustible gas under pressure to burners 5, and controls 9 in gas line 7 to permit regulation of the quantity of gas fed to each burner 5, and hence the degree of heat applied to the underside of each portion of heating plate 3. It will of course be understood that by regulation of the quantity of gas to burners 5, the plate 3 or any portion of it may be caused to reach cooking temperature for any given food, or may be merely maintained at a warming temperature.

The operating mechanism of the present invention includes a straight horizontal bar 11 disposed adjacent one side of plate 3 and parallel to the front and rear edges of plate 3. The ends of bar 11 extend endwise substantial distances in opposite directions beyond both side edges of plate 3. Bar 11 is supported by a pair of horizontal guide bars 13 perpendicular to bar 11 and extending rearwardly of bar 11 parallel to each other on the side of bar 11 opposite the major portion of the exposed upper surface of plate 3. Guide bars 13 roll between and are supported on horizontally spaced pairs of opposed rollers 15, which provide an anti-friction mounting for horizontal reciprocatory movement of the assembly of bar 11 and bars 13.

A link 17 is pivotally secured for rotation about a horizontal axis at its forward end to the inner side of each guide bar 13, and at its rear end to the forward end of a crank 19. Crank 19, in turn, is fixedly mounted at its rear end on a horizontal shaft 21 parallel to bar 11. Shaft 21 is mounted for rotation about a horizontal axis in a pair of horizontally spaced trunnions 23.

Shaft 21 fixedly carries a sprocket 25, and a sprocket chain 27 is trained about sprocket 25 and also about a drive sprocket 29 mounted on the drive shaft 31 of an electric motor 33 carried by the heater. If desired and necessary, reduction gearing (not shown) may be interposed in the drive train between motor 33 and crank 19. Suffice it to say that when motor 33 operates, shaft 21 is caused to rotate and crank 19 is caused to revolve, which causes crank 19 to reciprocate guide bars 13, thereby reciprocating bar 11 horizontally in a direction perpendicular to its length.

A plurality of elongated racks 35, which may for example be of the bent wire type, are slidably supported at one end on bar 11 and at the other end on and for sliding movement over plate 3. Racks 35 are disposed with their lengths perpendicular to bar 11. At their ends adjacent bar 11, racks 35 have a pair of downwardly opening hooks 37 spaced apart lengthwise of bar 11 and disposed one on each side of rack 35. At their other ends, the wire of racks 35 is bent downwardly to form short legs 39 which rest on and slide over the upper surface of plate 3. Between hooks 37 and legs 39, racks 35 are characterized by a pair of vertically spaced horizontal side rods 41 on each side of each rack 35.

Racks 35 also comprise cross rods 43 extending between and interconnecting the lower side rods 41 and disposed parallel to bar 11 and perpendicular to side rods 41. Cross rods 43 thus define between them a plurality of open-bottom compartments 45 which are elongated in a direction parallel to bar 11. The compartments 45 as a whole, however, are disposed in a series that extends the length of each rack 35, that is, parallel to the direction of reciprocation of bar 11. In assembled relationship on the heater, there will be a plurality of racks 35 each hooked at its rear end over and slidably supported on bar 11 and resting at its forward end on legs 39. Although the indvidual racks 35 are elongated in the direction of reciprocation of bar 11, the group of racks as a whole comprises a series of racks extending parallel to bar 11.

In use, compartments 45 are filled each with one frankfurter 47. Frankfurters 47 are of the usual elongated shape, and the elongated compartments 45 are so proportioned that the cross rods 43 at either side of a compartment 45 are spaced apart a distance slightly less than the width of a frankfurter 47; but the cross rods 43 are not spaced so close together as to support frankfurters 47 in a position shown in FIGURES 2 and 3. Instead, in that position, with racks 35 loaded and resting on bar 11 and plate 3, the frankfurters 47 also rest on and are supported by heated plate 3. In this way, the heat of plate 3 is transmitted to frankfurters 47 not only by convection of the air above plate 3, but also by direct conductive heat exchange from plate 3 to frankfurters 47. Of course, there will be grease on the upper surface of plate 3, and this will promote the heating or cooking of frankfurters 47.

When the mechanism of the present invention is set in operation, bar 11 is caused to reciprocate between the full and phantom line positions shown in FIGURES 2 and 3. Cross rods 43 thus push generally laterally against frankfurters 47, but as the lower edges of frankfurters 47 rest on plate 3, the frankfurters are frictionally impeded by plate 3. This causes the frankfurters to roll on plate 3 rather than to slide on plate 3. The stroke of bar 11 is at least as great as the circumference of frankfurters 47, so that all sides of the frankfurters roll into contact with plate 3 and the frankfurters are heated evenly throughout.

It is desirable from time to time to remove a rack of frankfurters from the heater and add a new rack, without having to unload the entire heater and without having to try to pick up a rack 35 directly from heater 3. It is to this end, therefore, that the racks are slidable lengthwise on bar 11. To unload a rack of frankfurters, it is necessary only to slide the end rack along bar 11 off one side of plate 3. The fact that bar 11 extends endwise beyond both sides of plate 3 helps in this operation.

The operation of loading a rack of frankfurters onto the heater also proceeds in the same manner, it being necessary only to hook a fresh rack of frankfurters 35 over the opposite end of bar 11 and push, whereupon all the racks in front of the new rack are pushed one place along plate 3 parallel to bar 11. If desired, the operation of inserting a new rack can be used to push an old rack off the opposite side of plate 3. In any event, it will be evident that the racks move freely across plate 3 along the length of bar 11 in a first-in-first-out sequence. It is therefore convenient to use the heater at such temperature that by the time a rack of frankfurters has completely traversed the width of plate 3 it has ben heated to the desired temperature for the desired time. In this way, overheating of the food and the wasting of heat are avoided.

It will also be appreciated that by the practice of the present invention, the picking up of a hot rack of frankfurters from above is entirely avoided. Instead, the leading edge of a rack of frankfurters emerging from the side of plate 3 toward which the racks move may be grasped from below with hot pan holders, so that the danger of burning the hands when operating the heater of the present invention is greatly reduced.

It will also be appreciated that the invention has utility in the loading and unloading of empty racks onto and from the heater. Thus, the racks can be put on empty and then loaded with frankfurters or other food, and the frankfurters or other food after heating can be removed from the leading rack so that only the empty rack is removed from the heater. These and other variations in the structure and manner of use of the present invention are all within the scope of the invention.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand, such modifications and variations are considered to be within the purview and scope of the present invention as defined by the appended claims.

What is claimed is:

1. A frankfurter heater comprising a heatable substrate, an elongated bar, means for reciprocating the bar in a direction normal to its length, a plurality of racks elongated in the direction of reciprocation of the bar and resting slidably on the substrate and slidably interconnected with the bar for sliding movement relative to the bar lengthwise of the bar, the racks being disposed in a series parallel to the length of the bar, each rack providing a series of open-bottomed compartments disposed in a series parallel to the direction of reciprocation of the bar, each compartment being elongated in a direction parallel to the length of the bar, so that frankfurters placed in the compartment parallel to the length of the bar will contact the substrate and upon reciprocation of the bar and with it the racks the frankfurters will be caused to roll back and forth on the substrate, and so that the racks and frankfurters can be slid bodily as a group along and relative to the bar for the removal of an end rack from the advancing end of the group of racks and the addition of an end rack to the retreating end of the group of racks.

2. A food heater as claimed in claim 1, the bar being of a length greater than the width of the substrate and extending endwise in opposite directions beyond the edges of the substrate which are subjacent to the bar.

3. A food heater comprising a heatable substrate, rack means for variably positioning food relative to the substrate to be heated by the substrate, a slideway, means interconnecting the rack means and the slideway for sliding movement of the rack means lengthwise of the slideway in a first direction, and means for reciprocating the slideway and the rack means together as a unit in a second direction at a substantial angle to said first direction.

4. A food heater as claimed in claim 3, said substantial angle being substantially 90°.

5. A food heater as claimed in claim 3, the slideway comprising a bar elongated in said first direction, the rack means being slidable along the bar and onto and off the ends of the bar.

6. A food heater as claimed in claim 5, the bar being of a length greater than the width of the substrate and extending endwise in opposite directions beyond the edges of the substrate which are subjacent to the bar.

References Cited by the Examiner

UNITED STATES PATENTS

| | | | |
|---|---|---|---|
| 1,391,269 | 9/1921 | O'Brien | 99—423 X |
| 2,584,061 | 1/1952 | Stilphen | 99—422 |
| 2,631,525 | 3/1953 | Finizie | 99—423 |
| 2,843,037 | 7/1958 | Waas | 99—423 |

BILLY J. WILHITE, *Primary Examiner.*